United States Patent
Silberschatz et al.

(10) Patent No.: US 6,556,578 B1
(45) Date of Patent: Apr. 29, 2003

(54) EARLY FAIR DROP BUFFER MANAGEMENT METHOD

(75) Inventors: Abraham Silberschatz, Summit, NJ (US); Banu Ozden, Summit, NJ (US); John Bruno, Santa Barbara, CA (US); Huzur Saran, New Delhi (IN)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/295,458

(22) Filed: Apr. 14, 1999

(51) Int. Cl.[7] .......................... H04L 12/28; H04L 12/56
(52) U.S. Cl. ........................................ 370/412; 370/234
(58) Field of Search ................................. 370/412, 229, 370/230, 231, 232, 233, 234, 235, 236, 410, 413, 414, 415, 416, 352, 400, 401; 710/52, 53, 54, 56, 57

(56) References Cited

U.S. PATENT DOCUMENTS

| | | | | |
|---|---|---|---|---|
| 6,097,698 A | * | 8/2000 | Yang et al. | 370/231 |
| 6,141,323 A | * | 10/2000 | Rusu et al. | 370/236 |
| 6,181,706 B1 | * | 1/2001 | Anderson et al. | 370/412 |
| 6,215,769 B1 | * | 4/2001 | Ghani et al. | 370/230 |
| 6,219,728 B1 | * | 4/2001 | Yin | 370/229 |

OTHER PUBLICATIONS

S. Floyd and V. Jacobson, "Random Early Detection Gateways for Congestion Avoidance", *IEEE/ACM Transactions on Networking*, Aug. 1993.

B. Suter, T.V. Lakshman, D. Stiliadis, and A. K. Choudhury, "Design Considerations for Supporting TCP with Per–Flow Queueing", *Proceedings of IEEE INFOCOM SanFrancisco*, Mar. 1998.

R. Guérin, S. Kamat, V. Peris, and R. Rajan, "Scalable QoS Provision Through Buffer Management," *Proceedings of the ACM SIGCOMM Vancouver*, Sep., 1998.

Ellen L. Hahne and Robert G. Gallager, Round Robin Scheduling for Fair Flow Control in Data Communication Networks, *IEEE International Conference on Communications*, Jun. 1986, pp. 103–107.

Dong Lin and Robert Morris, Dynamics of Random Early Detection, *IEEE SIGCOMM '97*, Sep., 1997.

* cited by examiner

*Primary Examiner*—Douglas Olms
*Assistant Examiner*—Brian Nguyen
(74) *Attorney, Agent, or Firm*—Darby & Darby PC (57) ABSTRACT

A method for managing a buffer pool containing a plurality of queues is based on consideration of both (a) when to drop a packet and (b) from which queue the packet should be dropped. According to the method a packet drop is signaled with the global average queue occupancy exceeds a maximum threshold and is signaled on a probabilistic basis when the global occupancy is between a minimum threshold and the maximum threshold. Each queue has a particular local threshold value associated with it and is considered to be "offending" when its buffer occupancy exceeds its local threshold. When a packet drop is signaled, one of the offending queues is selected using a hierarchical, unweighted round robin selection scheme which ensures that offending queues are selected in a fair manner. A packet is then dropped from the selected offending queue.

32 Claims, 5 Drawing Sheets

EARLY FAIR DROP BUFFER MANAGEMENT METHOD

TECHNICAL FIELD

This invention is related to a method and system for managing data packet queuing in a network gateway environment. More particularly, this invention relates to a method and system that determines both when a packet must be dropped and what packet to drop and which also provides fair queuing link scheduling and hierarchical link sharing.

BACKGROUND OF THE INVENTION

An important aspect of a data network is management of gateway buffers. For large networks, such as the Internet, a typical gateway buffer will process many data flows, each of which must be buffered in some manner. In practice, the volume of each flow varies and each flow is often "greedy", seeking to use more of the total buffer space than would be permitted under a fair share allocation. Gateway queuing policies therefore strive to balance maximum throughput with fair allocation of resources.

A common data transmission protocol is Transmission Control Protocol, ("TCP"). TCP, the most common data transport layer protocol used on local area networks and the Internet, is an adaptive protocol that seeks to adjust the data transport rate to the available link bandwidth. A TCP connection is a "closed loop" flow whose behavior depends on feedback from the network. This feedback comes in the form of acknowledgments ("ACKs") from the destination site corresponding to successfully delivered data packets. When the network is congested, packets are dropped and corresponding ACKs are not returned. When TCP detects that a packet has been dropped, it reduces its data throughput. Thus TCP throughput is sensitive to packet dropping policies at congestion points in the network.

Packet dropping policies drop packets to manage buffer overload conditions and to signal a TCP flow to reduce its data throughput. Conventional packet dropping policies make a determination about one of either (a) when to drop a packet, in which case the packet to be dropped is fixed, or (b) which packet to drop, in which case when to drop is fixed. Conventional policies and can be classified according to which of the decisions are not fixed.

Known packet dropping policies, such as Early Random Drop ("ERD"), Random Early Detection ("RED"), and Flow Random Early Drop ("FRED"), determine when a packet drop is required based on the global state of the server or the local states of the individual data flows. Then, once the decision to drop a packet is made, the next incoming packet is dropped. In other words, the "what to drop" dimension is fixed. Both ERD and RED examine the global state of the server and drop a packet when the occupancy exceeds a given threshold. In ERD, incoming packets are dropped With a predetermined probability when the instantaneous buffer occupancy exceeds a minimum threshold. In RED, packets are always dropped when the global average queue length exceeds a maximum threshold and are dropped with a probability which is a function of the average queue length when the global average queue length is between a minimum threshold value and the maximum threshold. FRED operates similarly to RED, except that the state of each queue is examined. If an arriving packet's flow queue is greater than a global maximum threshold value, then the packet is dropped. If the queue length is between a minimum and the maximum thresholds, the packed is dropped with a given probability.

A primary drawback to these types of packet drop policies is that the policy is not fair to data flows with input rates that are smaller than their fair output share. This is because all of the data flows experience the same loss rate and, as a result, a flow that uses much less than its fair share still experiences dropped packets. This in turn prevents a low bandwidth adaptive flow, such as TCP, from claiming its fair share of the buffer resources and link bandwidth. In addition, the presence of a non-adaptive flow in the buffer can cause excessive packet drops from all of the flows. If a non-adaptive flow is aggressive in its use of buffer resources, the packet drops will cause the adaptive flows to reduce their bandwidth, thus preventing the adaptive flows from achieving their fair share of resources, even if the congestion is not severe. Furthermore, while FRED addresses some deficiencies of using the global state to make the when-to-drop decision, it may also be unfairly limiting, since no queue is allowed to have a length exceeding the global maximum threshold, even if no other queues are backlogged and thus, excess buffer capacity is available. In addition, neither RED, FRED, nor ERD contemplate managing flows which are assigned different shares of the server's resources.

Other packet drop algorithms such as Longest Queue Drop ("LQD") and Approximated Longest Queue Drop (ALQD) drop a packet when the buffer is full. Thus, the "when to drop" dimension for these algorithms is fixed. The "what to drop" decision is based on the state of the per-flow queues. For example, when the buffer is full, LQD drops a packet from the largest queue. However, algorithms of this type also hinder adaptive flows from reaching their fair share of the link bandwidth. LQD in particular slows down the rate-adjustment of adaptive flows to changes in their allocated fair share due to changing load and the arrival and departure of bursts of competing traffic. LQD also produces large variations in the "short" term throughput of an adaptive flow, reducing the overall throughput.

Accordingly, it would be advantageous to provide a packet drop algorithm which solves these problems, provides an early signaling mechanism for adaptive flows, so that they can adjust their rates before more drastic cuts are needed, and fairly drops packets from flows exceeding a hierarchically assigned share of the server's resources, thus avoiding consecutive drops from the same flow and causing a "smoothing" out of the reductions in the rates of adaptive flows over all of the flows which seek to use more than their respective fair share.

SUMMARY OF THE INVENTION

According to the present invention, a method for managing a buffer pool is presented which considers both when a packet should be dropped and which packet should be dropped. The buffer receives data packets from two or more data flows and buffers these packets in a plurality of queues. On a recurring basis, such as the arrival and departure of packets from the buffer, the global average queue occupancy of the queues is determined. A packet-drop indication is provided when the global average exceeds a predetermined maximum threshold. When a packet is to be dropped, each of the queues is then evaluated to locate "offending" queues which are using more than a predetermined amount of the available global queue resources, i.e., those queues which are using more than a determined fair share of the global resources. One of the offender queues is then selected and a packet is dropped from the selected offender queue.

In a preferred embodiment, the global average queue occupancy is determined using an exponential weighted moving average filter. A packet drop indication is also preferably made on a probabilistic basis when the global average queue occupancy exceeds a predetermined minimum threshold but does not exceed the maximum threshold.

The buffer management method of the present invention can be used in combination with any type of link scheduler as part of a network gateway to increase system efficiency. Experimentally, the best performance increase relative to conventional buffer management techniques has been found to occur when early fair drop buffer management is used in connection with a per-flow fair link scheduling algorithm, such as WF, or a hierarchical link scheduling algorithm, such as $WF^2Q+$.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

A hierarchical buffer representation will first be described. The buffer management policy according to the invention will then be discussed with reference to the hierarchical buffer assignment. It should be understood, however, that the new buffer management policy can also be used to manage non-hierarchical or flat buffers.

Figure 1A:
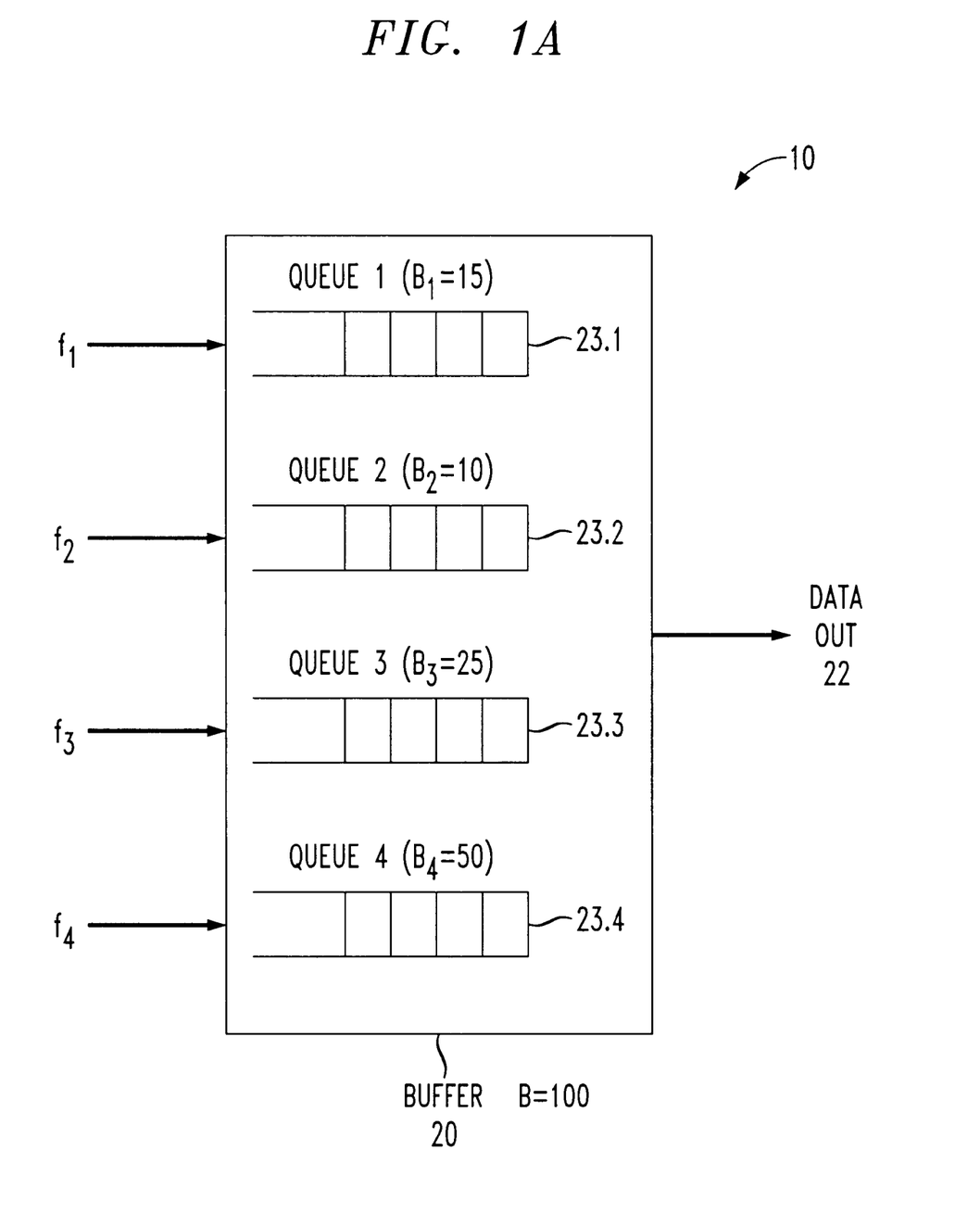
FIGS. 1a and 1b are idealized representations of a data gateway buffer and network node.

FIG. 1a is an idealized representation of a data gateway 10 which can be managed according to the, method of the present invention. The gateway 10 includes a buffer 20 which receives and buffers data packets from a plurality of input flows $f_1-f_4$ and passes buffered data to an output 22. The buffer 20 has a total packet capacity of B which can be divided among separate queues 23.1–23.4 which are associated with each of the respective data flows. The queue associated with each flow can be assigned a fair share allocation of the total buffer capacity indicating the total amount of the buffer that should be utilized by a given queue when all the flows are continuously backlogged and using their queues at maximum. In this example, the buffer 20 has a total packet capacity of 100 and the queues 23.1–23.4 associated with flows $f_1-f_4$, respectively, have an allocated fair share usage of 15, 10, 25, and 50, respectively.

Figure 1B:
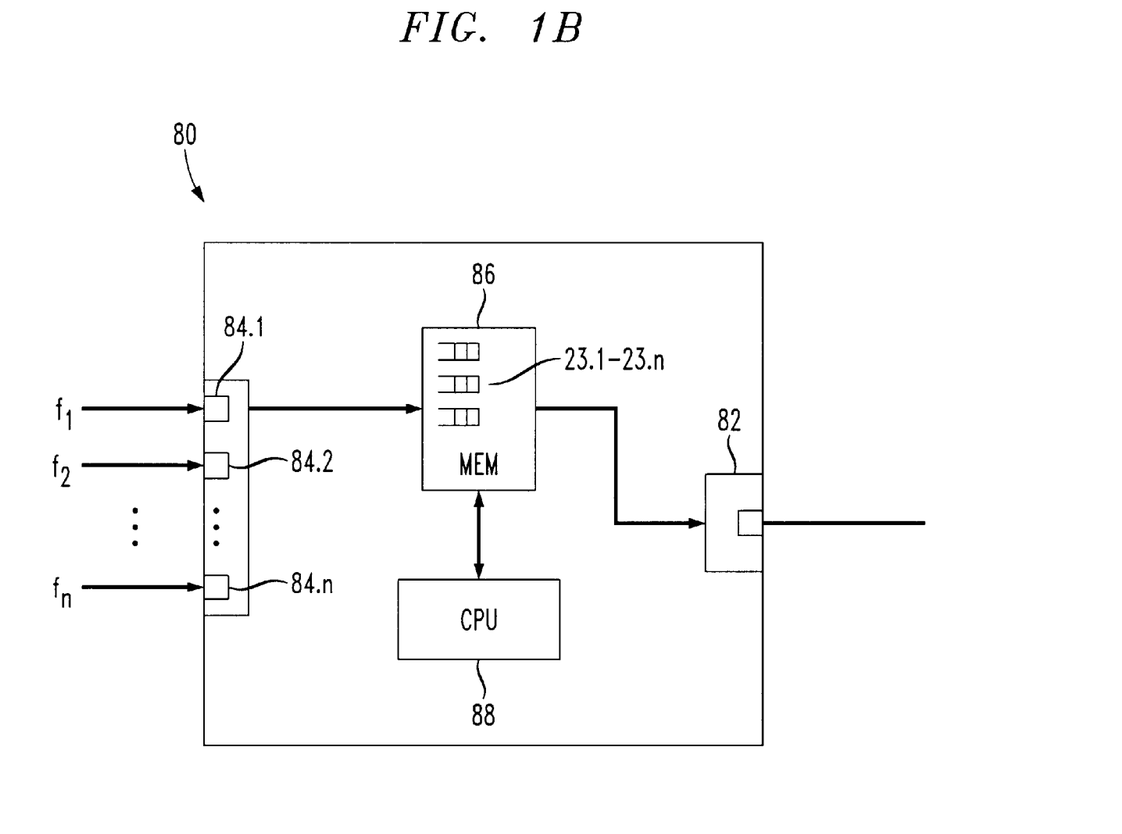

FIG. 1b is a high level diagram of a network node 80 operating as a data gateway according to the invention. The network node 80 has at least one output port 82 and a plurality of input ports 84.1–84.n for receiving respective data packet flows $f_1-f_n$. Each input port is associated with a respective queue 23.1–23.n maintained within a memory 86. As data packets are received at an input port, they are added to the respective queue. A processor 88 is configured, i.e., by means of software stored in memory 86, to manages the transfer of data packets from the queues to the output port 82 and to drop packets in accordance with the criteria discussed below.

Figure 2A:
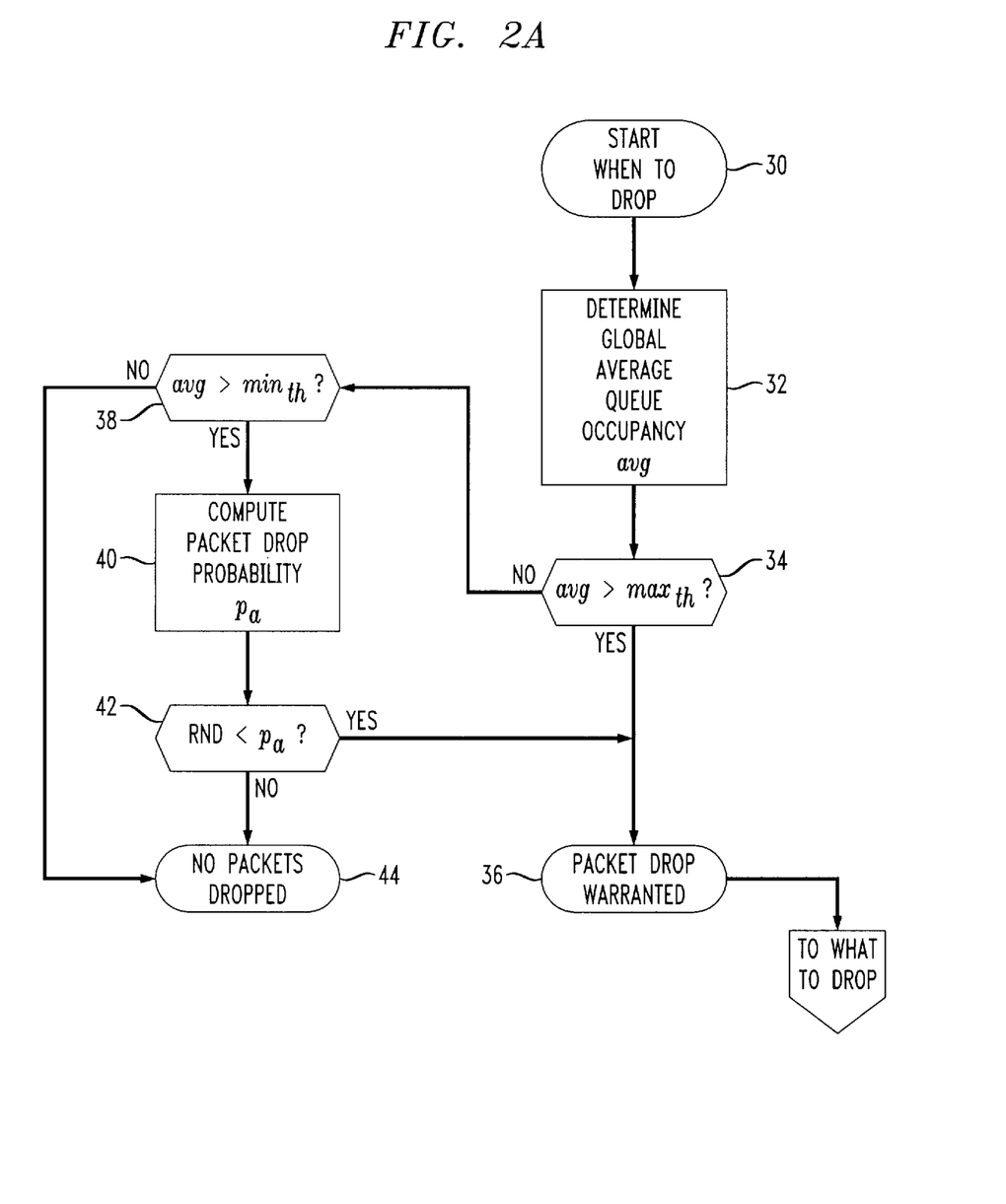
FIGS. 2a and 2b are flowcharts illustrating the buffer management policy of the present invention.
Figure 2B:
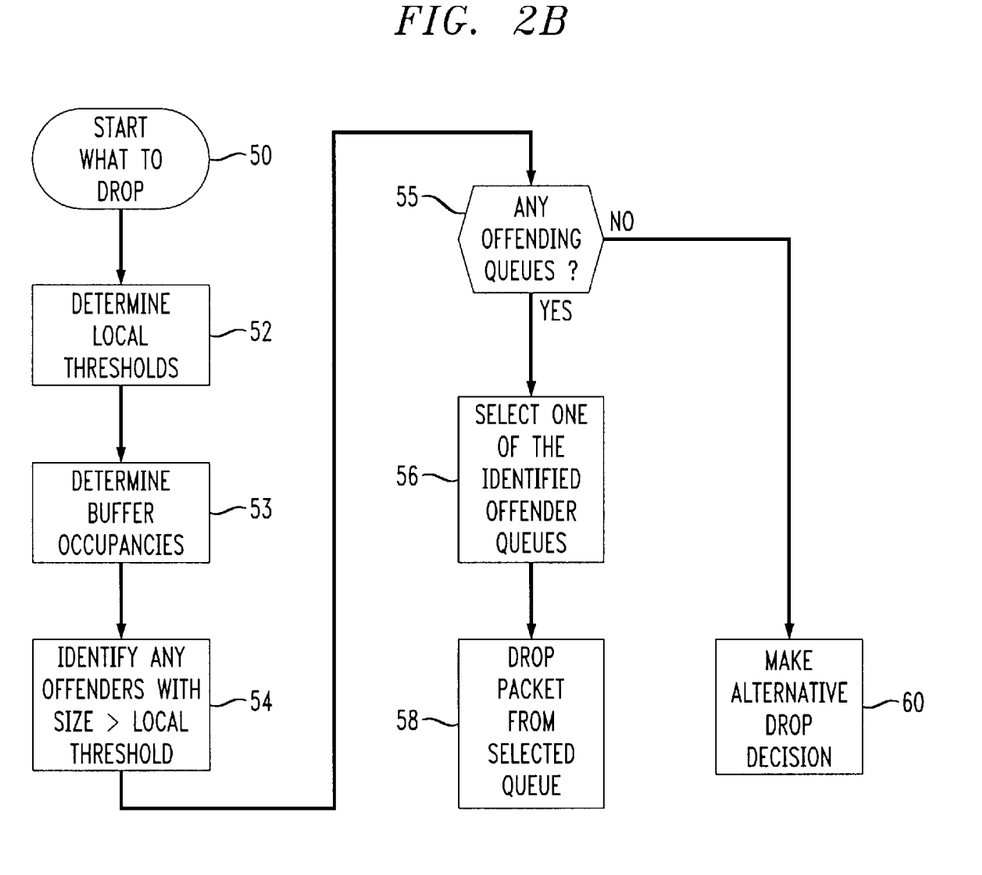

FIGS. 2a and 2b are flowcharts illustrating the buffer management method of the present invention. There are two major aspects of the method. First, the global buffer state is analyzed to determine when to drop a packet. (FIG. 2a). Then, a decision as to which one of the queues to drop a packet from is made. This decision is based on an evaluation of queue occupancies. (FIG. 2b). Each of these aspects will be discussed in turn.

Turning to FIG. 2a, the decision regarding when to drop decision is based on two factors: (1) whether the average buffer occupancy fore the queues exceeds a predetermined threshold value, and (2) a dynamic probability which is a function of the average buffer occupancy.

The first step in this portion of the process is to determine an average global queue occupancy ("avg"). (Step 32). Various techniques are available for calculating a value for avg, as will be known to those of skill in the art. Preferably, the global average queue occupancy is determined using an exponential weighted moving average filter, where the average is recomputed on the arrival of each new packet at the buffer. A particular method for determining the global average queue occupancy for a single queue buffer is disclosed in sections 4.4 and 4.5 of D. Lin and R. Morris, "Dynamics of Random Early Detection," *IEEE SIGCOMM '97*, September, 1997, the entire contents of which is hereby incorporated by reference. This and similar methods can be extended to cover a per-flow queue buffering system using techniques known to those of skill in the art.

Once a global average queue occupancy is determined, it is compared to a maximum threshold "$max_{th}$". When $avg>max_{th}$, a packet drop is warranted. (Steps 34, 36). In a first embodiment, when $avg \leq max_{th}$, no packet is dropped. Preferably, however, if avg does not exceed $max_{th}$ but is greater than a minimum threshold $min_{th}$ (step 38), a dynamically generated probability $p_a$ is determined (step 40) and applied such that the probability of a packet drop indication being provided is $p_a$. One method of doing this is to generate a random number r having a value between zero and $max_p$, the maximum value of $p_a$, and then indicating that a packet must be dropped when $r \leq p_a$ (steps 42, 36). If $avg<min_{th}$, no packet drop indication is provided. (Steps 44, 38).

Most preferably, the magnitude of $p_a$ increases with increases in avg and a count value, up to the maximum probability $max_p$, where count represents the number of packets buffered successfully since the most recent packet drop. In the preferred embodiment, $p_a$ is calculated as follows:

$$p_b = max_p(avg-min_{th})/(max_{th}-min_{th}) \quad \text{(Equ. 1)}$$

$$p_a = p_b/(1-p_b*count) \quad \text{(Equ. 2)}$$

The count value can be incremented every time $p_a$ is computed and reset to zero whenever a packet is dropped. In this embodiment, the maximum threshold, $max_{th}$, is equal to the available buffer capacity B, and the value of $min_{th}$ is equal to $max_{th}/2$. The initial packet dropping probability $max_p$ is empirically chosen based on link speeds to ensure an appropriate number of packet drops per second when the minimum queue length threshold is exceeded.

As shown in FIG. 2b, once the when to drop decision is made, a determination as to what to drop is made, i.e., from which queue should the packet be dropped. First, a local queue size threshold and a buffer occupancy for each of the queues and possibly various combinations of two or more queues is determined (steps 52–53). The determination of whether a particular queue is offending can be made on an as-needed basis during the selection process. Alternatively, the determination can be done on a periodic basis, such as in response to packets entering and/or leaving the buffer.

Next, the threshold value for queue and/or queue combination is compared with the buffer occupancy to identify any "offending" queues or combinations having an occupancy which exceeds the associated local threshold (step 54). If at least one offending queue has been identified (step 55), a particular queue is selected from the identified offender queues based on an unweighted round robin scheduling routine (step 56) and a packet is dropped from the selected queue (step 58).

Depending on the particular calculations and timing during the determination of avg and the buffer occupancies, as well as on the various threshold values, it is possible that the when to drop determination will indicate that a packet drop is warranted but an examination of the queues will reveal none which are offending. In this situation, preferably, no packet drop is performed. However, an alternative drop decision can be made (step 60), such as dropping a packet from a queue selected at random, from the largest queue, etc.

Figure 3:
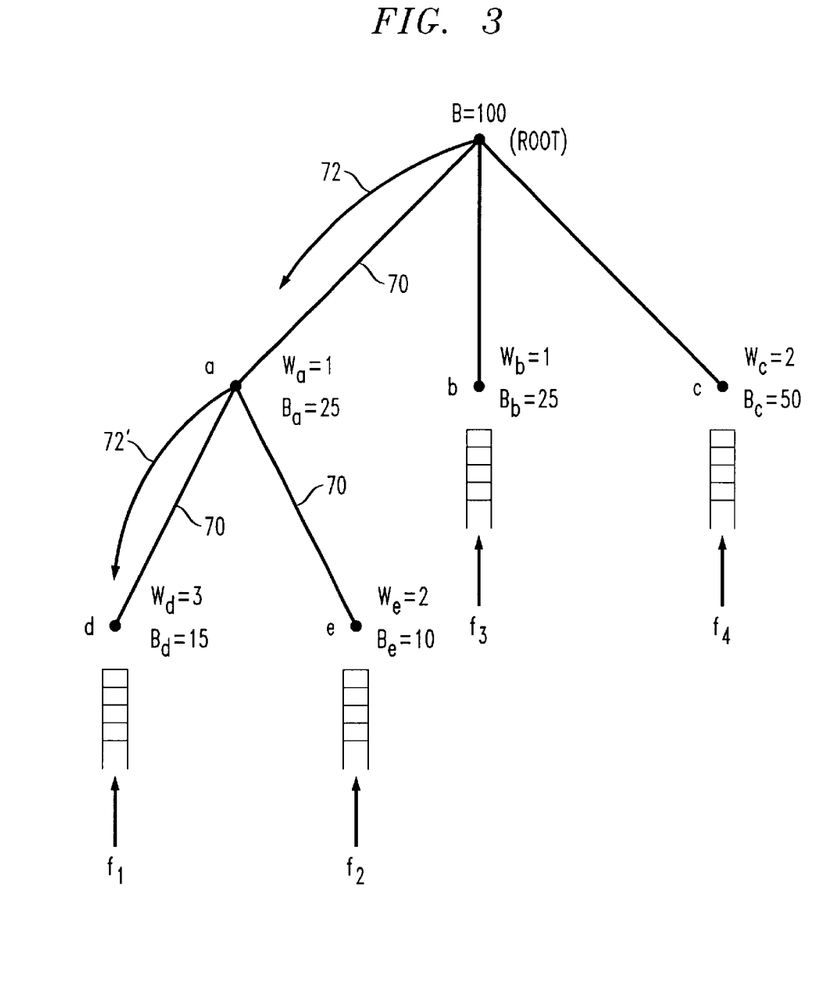
FIG. 3 is a hierarchical tree representation of the buffer of FIG. 1.

A particular implementation of the what to drop determination will now be discussed with respect to a buffer having a hierarchical resource assignment for each of the queues. As shown in FIG. 3, the buffer resource assignment to the flows $f_1$–$f_4$ of FIG. 1 can be represented as a hierarchical tree in which the root node represents the entire buffer space B and each leaf node is uniquely associated with one of the flows.

Each node other than the root can be assigned weight w which represents a fair share allocation of the buffer space to that node. Internal nodes, i.e., those with descendants, can be considered as representing the collection of queues associated with the descendant leaf nodes. According to one aspect of the invention, the nominal buffer allocation for each node serves as the threshold value which is compared to an actual queue (or queue collection) size during steps 52–54 to identify offender queues.

Given a hierarchically weighted buffer, such as shown in FIG. 3, the nominal buffer allocation for each of the nodes in the tree can be calculated by dividing the buffer allocation of a parent node amongst its descendent nodes according to the assigned weight w in a top-down manner. More specifically, for a parent node v having a buffer allocation $B_v$ and immediate descendants $v_1$ to $v_{k_f}$ the nominal buffer allocation $B_i$ for a node $v_i$, $1 \leq i \leq k_f$ is:

$$B_i = \frac{w_i B_v}{\sum w_j} \quad \text{(Equ. 3)}$$

where the sum of $w_j$ is taken over all immediate descendant nodes $v_j$ that are backlogged (if the node is a leaf node) or have at least one backlogged descendant (if the node is internal). It should be noted that the actual buffer share of a node changes over time with the arrivals and departures of packets, as flows backlog and reduce their bandwidth usage, and as excess buffer capacity unused by one queue is reallocated to others.

For example, the tree shown in FIG. 3 is a two-level buffer hierarchy having a total buffer pool of B=100 packets and supporting four flows $f_1$–$f_4$. The root node has three immediate descendants nodes, a, b, and c, having assigned weights $w_a$=1, $w_b$=1, and $w_c$=2 respectively. Nodes b and c are leaf nodes and are associated with the queues for flows $f_3$ and $f_4$, respectively. Node a is a parent node and has as its descendants leaf nodes d and e, which are associated with the queues for flows $f_1$ and $f_2$, respectively, and have assigned weights $w_d$=3 and $w_e$=2. When all of the flows $f_1$–$f_4$ are backlogged (i.e., when each queue is filled to capacity) the nominal buffer allocations for the first level of nodes are $B_a$=25, $B_b$=25, and $B_c$=50. The buffer allocation to node a is further distributed among nodes d and e according to the assigned weights, resulting in $B_d$=15 and $B_e$=10.

In addition to determining a local threshold for each of the nodes, the current buffer occupancy associated with each node in the hierarchy is also determined. For the leaf nodes, the buffer occupancy corresponds to the number of packets in the queue associated with the node. For internal nodes, the buffer occupancy is a function of the occupancies of descendant nodes. In the simplest case, the occupancy of an internal node is equal to the sum of the occupancies of its immediate descendant nodes.

In a particular implementation, data relating to the hierarchal buffer is stored as a tree. Each node of the tree is represented by a data structure containing pointers 70 to any descendant nodes and which stores the weight assigned with the node as well as the node's determined local threshold and buffer occupancy.

Once the buffer occupancy and nominal buffer allocations for each of the nodes is determined, those nodes having an occupancy exceeding the nominal allocation are identified as "offender" nodes. Starting from the root node, the tree is traversed using an unweighted round robin selection procedure among immediate descendant nodes which are offending. Selection continues until a leaf node is reached. In other words, at each level, the path to traverse is selected according to an unweighted round robin selection from among those immediate descendant nodes which are offender nodes.

In this implementation, each parent node in the tree contains a drop pointer, such as drop pointers 72 and 72'. The drop pointer identifies which of the immediate descendant nodes to check first during the round robin selection process. When a packet drop is indicated, the local threshold and buffer occupancy of the node pointed to by the drop pointer is checked to determine if that node is offending. If it is not, the drop pointer is advanced to the next sibling node, which is then checked. This continues until an offending node has been found or all sibling nodes have been checked, i.e., the drop pointer is advanced to the node it started from.

If an offending leaf node has been identified, a packet is dropped from the queue associated with that node. If the identified node is not a leaf node, the process repeats, making a selection from among the immediate descendant nodes of the selected node which are offending using the drop pointer of the selected node. The process continues until a leaf node is selected. According to the unweighted round robin processes, once an offending node has been selected, the drop pointer which points to the offending node is advanced to the next sibling node. Preferably the packet at the head of the queue is dropped. However, a packet may be dropped from other portions of the queue, i.e., according to a priority scheme.

Under some circumstances, it is possible that none of a set of sibling nodes will be offending, even though a parent node is offending or a packet drop has been indicated. Should this occur, the nodes of each level in the tree can be checked, in turn, until an offending leaf node is located, in which case a packet is dropped from the offender queue. If no offending leaf nodes are present, no packet drop is performed. Alternatively, if there are no offending leaf nodes, a packet can be dropped from the queue which has the maximum usage, from the queue with an occupancy closest to the threshold, from a randomly selected queue, etc.

For example, with reference to FIG. 3, the drop pointer 72 for the root node is initially pointing to node a and the drop pointer 72' for node a is initially pointing to node d.

Assuming that each of these nodes have exceeded their nominal buffer allocation, the queue selection process, starting from the root node, follows the drop pointer 72 and selects node a (since it is an offending node). The root node drop pointer is then advanced to node b. Node a's drop pointer 72' is then followed to node d, which is selected because it too is offending. As a result, a packet is dropped from the queue associated with the selected leaf node, node d. Note that once node d has been selected, the drop pointer 72' for node a is advanced to node e.

Assuming that the nominal buffer allocations for all nodes continue to be exceeded, the next selection results in a packet drop from the queue associated with node b, and the drop pointer 72 being advanced to node c. The drop pointer 72' from node a to node e remains unchanged. Continuing in this manner, the next packet is selected from the queue associated with node c and the root node drop pointer 72 is advanced to node a while the node a drop pointer 72' still points to node e. Finally, a packet will be dropped from node e, after which the root node drop pointer 72 will point to node b and the drop pointer 72' for node a will point to node d.

Because offending queues are selected in a hierarchical round robin fashion, packets are dropped from each offending queue in turn. When the TCP protocol is used, each flow is signaled (by the packet drop) in turn that it is exceeding their nominal buffer allocation. Thus, all flows participate in the bandwidth reduction, as opposed to the unequal bandwidth reduction which occurs when signals (packet drops) are sent repeatedly to only the worst offender(s). In addition, the hierarchical structure of the buffer combined with the unweighted round robin scheduling provides flexibility in determining how frequently a particular node will be visited when all queues are offending, and therefore how much of a bandwidth reduction will be signaled to the flow associated with that node in comparison to the flows associated with other nodes. For example, with reference to FIG. 3, if all queues are offending, nodes b and c will be selected twice as frequently as nodes d and e due to the presence of intermediate node a.

While the invention has been particularly shown and described with reference to preferred embodiments thereof, it will be understood by those skilled in the art that various changes in form and details may be made therein without departing from the spirit and scope of the invention.

We claim:

1. A method for managing a buffer pool receiving data packets from a plurality of flows and buffering said packets in a plurality of queues, said method comprising the steps of:
   (a) determining a global average queue occupancy avg for the plurality of queues;
   (b) determining that a packet must be dropped if the global average queue occupancy exceeds a predetermined maximum threshold $max_{th}$;
   (c) determining for each one of said queues a local threshold and a buffer occupancy;
   (d) evaluating at least one of said queues, in response to the determination that a packet must be dropped, to identify offender queues having a respective buffer occupancy exceeding the respective local threshold;
   (e) selecting, in response to the identification of at least one offender queue, a particular one of said identified offender queues; and
   (f) dropping a packet from said selected offender queue.

2. The method of claim 1, wherein the global average queue occupancy is determined using an exponential weighted moving average filter.

3. The method of claim 1, further comprising the steps of:
   calculating a packet drop probability "$p_a$" when the global average queue occupancy avg exceeds a predetermined minimum threshold "$min_{th}$" but does not exceed $max_{th}$, the packet drop probability $p_a$" having a maximum value of "$max_p$".
   generating a random number r between zero and $max_p$; and
   determining that a packet must be dropped when $r \leq p_a$.

4. The method of claim 3, wherein the packet drop probability $p_a$ increases with increases in the global average queue occupancy and the number of packets buffered successfully since the most recent packet drop.

5. The method of claim 1, wherein said selection step is a hierarchical unweighted round robin selection.

6. The method of claim 1, further comprising the steps of:
   selecting a queue according to an alternative selection in response to a condition where no offender queues are identified during said evaluating step; and
   dropping a packet from said selected queue.

7. A method for managing a buffer pool receiving data packets from a plurality of flows and buffering said packets in a plurality of queues, said buffer pool being organized as a hierarchically weighted tree having a root node and a plurality of descendant nodes including a plurality of leaf nodes in one-to-one correspondence with each of said plurality of queues, said method comprising the steps of:
   (a) periodically determining a global average queue occupancy avg for the plurality of queues;
   (b) determining that a packet must be dropped if the global average queue occupancy exceeds a predetermined maximum threshold $max_{th}$;
   (c) determining for each of said plurality of descendant nodes a nominal buffer allocation;
   (d) determining for each of said plurality of descendant nodes a buffer occupancy, wherein a descendant node is offending when the respective buffer occupancy exceeds the respective nominal buffer allocation;
   (e) traversing the tree starting from the root node in response to the determination that a packet must be dropped until reaching a particular leaf node by selecting a traversal path at each level from among immediate descendant nodes which are offending; and
   (f) dropping a packet from the queue in correspondence with the particular leaf node.

8. The method of claim 7, wherein, during the step of traversing the tree, a traversal path is selected from among immediate descendant nodes which are offending in an unweighted round robin manner.

9. The method of claim 7, wherein each descendent node is assigned a respective weight and the step of determining for each of said plurality of descendant nodes a nominal buffer allocation comprises the step of dividing the buffer allocation of a parent node amongst its immediate descendant nodes according to the respective weight of the descendent nodes, the buffer allocation of the root node corresponding to the total size of the buffer pool.

10. The method of claim 9, wherein for node v having a nominal buffer allocation of $B_v$ and a plurality of immediate descendants with respective weights including a node $v_i$ having a respective weight $w_i$, the nominal buffer allocation $B_i$ for node $v_i$ is the product of $w_i$ and $B_v$ divided by a sum of the respective weights of the immediate descendant nodes of node v that are a leaf node associated with a queue that is one of (a) backlogged and (b) has a descendant leaf node associated with a queue that is backlogged.

11. The method of claim 7, wherein the global average queue occupancy is determined using an exponential weighted moving average filter.

12. The method of claim 7, further comprising the steps of:
calculating a packet drop probability "$p_a$" when the global average queue occupancy avg exceeds a predetermined minimum threshold "$min_{th}$" but does not exceed $max_{th}$, the packet drop probability $p_a$ having a maximum value of "$max_p$";
generating a random number r between zero and $max_p$; and
determining that a packet must be dropped when $r \leq p_a$.

13. The method of claim 12, wherein the packet drop probability pa increases with increases in the global average queue occupancy and the number of packets buffered successfully since most recent packet drop.

14. The method of claim 7, further comprising the step of selecting alternative traversal paths during said traversing step when no immediate descendant nodes are offending until a particular offending leaf node is located or it is determined that no leaf nodes are offending.

15. The method of claim 14, further comprising the steps of:
selecting a queue according to an alternative selection in response to a condition where no leaf nodes are offending; and
dropping a packet from said selected queue.

16. The method of claim 14, further comprising the step of ignoring the determination that a packet must be dropped in response to the condition that no leaf nodes are offending.

17. A network node comprising:
at least one output port;
a plurality of input ports for receiving respective data packet flows;
a plurality of queues stored in a memory, each queue associated with a respective input port, data packets received at a particular input from the respective flow to be added to the respective queue associated with the particular input; and
a processor configured to manage the contents of the queues in said network node, the processor configured to perform the following functions:
(a) determining a global average queue occupancy avg for the plurality of queues;
(b) determining that a packet must be dropped if the global average queue occupancy exceeds a predetermined maximum threshold $max_{th}$;
(c) determining for each one of said queues a local threshold and a buffer occupancy;
(d) evaluating at least one of said queues, in response to the determination that a packet must be dropped, to identify offender queues having a respective buffer occupancy exceeding the respective local threshold;
(e) selecting, in response to the identification of at least one offender queue, a particular one of said identified offender queues; and
(f) dropping a packet from said selected offender queue.

18. The network node of claim 17, wherein the processor global average queue occupancy function comprises an exponential weighted moving average filter.

19. The network node of claim 17, wherein the processor is configured to perform the additional functions of:
calculating a packet drop probability "$p_a$" when the global average queue occupancy avg exceeds a predetermined minimum threshold $min_{th}$ but does not exceed $max_{th}$, the packet drop probability $p_a$ having a maximum value of "$max_p$";
generating a random number r between zero and $max_p$; and
determining that a packet must be dropped when $r \leq p_a$.

20. The network node of claim 19, wherein the processor packet drop probability function $p_a$ increases with increases in the global average queue occupancy and the number of packets buffered successfully since the most recent packet drop.

21. The network node of claim 17, wherein the processor selection function comprises a hierarchical unweighted round robin selection function.

22. The network node of claim 17, wherein the processor is configured to perform the additional functions of:
selecting a queue according to an alternative selection in response to a condition where no offender queues are identified by said evaluating function; and
dropping a packet from said selected queue.

23. A network node comprising:
at least one output port;
a plurality of input ports for receiving respective data packet flows;
a buffer pool including a plurality of queues stored in a memory, each queue associated with a respective input port, data packets received at a particular input from the respective flow to be added to the respective queue associated with the particular input, said buffer pool being organized as a hierarchically weighted tree having a root node and a plurality of descendant nodes including a plurality of leaf nodes in one-to-one correspondence with each of said plurality of queues; and
a processor configured to manage the contents of the queues in said network node, the processor configured to perform the following functions:
(a) periodically determining a global average queue occupancy avg for the plurality of queues;
(b) determining that a packet must be dropped if the global average queue occupancy exceeds a predetermined maximum threshold $max_{th}$;
(c) determining for each of said plurality of descendant nodes a nominal buffer allocation;
(d) determining for each of said plurality of descendant nodes a buffer occupancy, wherein a descendant node is offending when the respective buffer occupancy exceeds the respective nominal buffer allocation;
(e) traversing the tree starting from the root node in response to the determination that a packet must be dropped until reaching a particular leaf node by selecting a traversal path at each level from among immediate descendant nodes which are offending; and
(f) dropping a packet from the offender queue in correspondence with the particular leaf node.

24. The network node claim 23, wherein the processor function of traversing the tree includes the function of selecting a traversal path from among immediate descendant nodes which are offending in an unweighted round robin manner.

25. The network node of claim 23, wherein each descendent node is assigned a respective weight and the processor function of determining for each of said plurality of descendant nodes a nominal buffer allocation comprises the functions of dividing the buffer allocation of a parent node amongst its immediate descendant nodes according to the respective weight of the descendent nodes, the buffer allocation of the root node corresponding to the total size of the buffer pool.

26. The network node of claim 25, wherein for node v having a nominal buffer allocation of $B_v$ and a plurality of immediate descendants with respective weights including a node $v_i$ having a respective weight $w_i$, the nominal buffer allocation $B_i$ for node $v_i$ is the product of $w_i$ and $B_v$ divided by a sum of the respective weights of the immediate descendant nodes of node v that are a leaf node associated with a queue that is one of (a) backlogged and (b) has a descendant leaf node associated with a queue that is backlogged.

27. The network node of claim 23, wherein the processor global average queue occupancy function comprises an exponential weighted moving average filter.

28. The network node of claim 23, wherein the processor is configured to perform the additional functions of:

calculating a packet drop probability "$p_a$" when the global average queue occupancy avg exceeds a predetermined minimum threshold $min_{th}$ but does not exceed $max_{th}$, the packet drop probability $p_a$ having a maximum value of "$max_p$";

generating a random number r between zero and $max_p$; and determining that a packet must be dropped when $r \leq p_a$.

29. The network node of claim 28, wherein the packet drop probability $p_a$ increases with increases in the global average queue occupancy and the number of packets buffered successfully since most recent packet drop.

30. The network node of claim 23, wherein traversing function of the processor includes the function of selecting alternative traversal paths step in response to the condition that no immediate descendant nodes are offending until a particular offending leaf node is located or it is determined that no leaf nodes are offending.

31. The network node of claim 30, wherein the processor is configured to perform the additional functions of:

selecting a queue according to an alternative selection in response to a condition where no leaf nodes are offending; and dropping a packet from said selected queue.

32. The network node of claim 30, wherein the processor is configured to perform the additional function of ignoring the determination that a packet must be dropped when no leaf nodes are offending.

* * * * *